United States Patent
Pawar et al.

(10) Patent No.: US 9,474,054 B1
(45) Date of Patent: Oct. 18, 2016

(54) MANAGEMENT OF RESOURCE ALLOCATION IN A WIRELESS COMMUNICATION SYSTEM

(71) Applicant: Clearwire IP Holdings LLC, Overland Park, KS (US)

(72) Inventors: Hemanth B. Pawar, Brambleton, VA (US); Shilpa K. Srivinas, Brambleton, VA (US); Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 210 days.

(21) Appl. No.: 14/171,258

(22) Filed: Feb. 3, 2014

(51) Int. Cl.
*H04W 72/04* (2009.01)
*H04W 28/02* (2009.01)

(52) U.S. Cl.
CPC ..... *H04W 72/0413* (2013.01); *H04W 28/0278* (2013.01)

(58) Field of Classification Search
CPC .................... H04W 72/0413; H04W 28/0278
See application file for complete search history.

(56) References Cited

U.S. PATENT DOCUMENTS

| | | | |
|---|---|---|---|
| 7,969,900 B2 | 6/2011 | Abdo et al. | |
| 8,331,394 B2 | 12/2012 | Harris et al. | |
| 2008/0182568 A1* | 7/2008 | Kim | H04M 1/2745 455/418 |
| 2008/0232333 A1* | 9/2008 | Jeong | H04W 72/1289 370/336 |
| 2009/0201884 A1* | 8/2009 | Chaponniere | H04W 92/20 370/332 |
| 2012/0039263 A1 | 2/2012 | Moberg et al. | |
| 2012/0069805 A1* | 3/2012 | Feuersanger | H04W 72/1284 370/329 |
| 2012/0269154 A1 | 10/2012 | Wang et al. | |
| 2014/0038588 A1* | 2/2014 | Ljung | H04W 52/0216 455/422.1 |
| 2015/0131535 A1* | 5/2015 | Wallentin | H04W 76/025 370/329 |

FOREIGN PATENT DOCUMENTS

| | | |
|---|---|---|
| WO | WO2010/112236 | 10/2010 |
| WO | WO2011002386 | 1/2011 |
| WO | WO2013044497 | 4/2013 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.9.0 (Dec. 2009).

3GPP, "3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0 (Mar. 2010).

(Continued)

*Primary Examiner* — Omar Ghowrwal

(57) ABSTRACT

A method and apparatus to help manage allocation of resources in a wireless communication system. A base station dynamically decides based on a type of bearer communication in which a user equipment device (UE) is engaged whether the base station will apply a buffer status report (BSR) process or a non-BSR process. In the BSR process, the base station responds to a scheduling request from the UE by allocating uplink resources for the UE to transmit a BSR to the base station, and the base station then receives the BSR and uses it as a basis to then allocate uplink resources for the UE to transmit bearer data to the base station. In a non-BSR process, the base station forgoes receipt and use of a BSR and instead responds to the scheduling request by allocating uplink resources for the UE to transmit bearer data to the base station.

7 Claims, 3 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (Release 9)," 3GPP TS 36213 V9.3.0 (Sep. 2010).

3GPP, "3rd Generation Partnership Project; Technical Specification Group Radio Access Network; Evolved Universal Terrestrial Radio Access (E-UTRA); User Equipment (UE) radio transmission and reception (Release 8)," 3GPP TS 36.101 V8.15.0 (Sep. 2011).

3GPP, "3rd Generation Partnership Project; Technical Specification Group Radio Access Network; Evolved Universal Terrestrial Radio Access (E-UTRA); Medium Access Control (MAC) protocol specification (Release 9)," 3GPP TS 36321 V9.6.0 (Mar. 2012).

3GPP, "3rd Generation Partnership Project; Technical Specification Group Radio Access Network; Evolved Universal Terrestrial Radio Access (E-UTRA); Base Station (BS) radio transmission and reception (Release 9)," 3GPP TS 36.104 V9.13.0 (Sep. 2012).

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36300 V9.10.0 (Dec. 2012).

3GPP, "3rd Generation Partnership Project; Technical Specification Group Radio Access Network; Evolved Universal Terrestrial Radio Access (E-UTRA); User Equipment (UE) radio transmission and reception (Release 9)," 3GPP TS 36.101 V9.18.0 (Dec. 2013).

* cited by examiner

MANAGEMENT OF RESOURCE ALLOCATION IN A WIRELESS COMMUNICATION SYSTEM

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WIMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or range of carrier frequencies In a frequency division duplex (FDD) arrangement, different carrier frequencies or ranges are used for the downlink than the uplink. Whereas, in a time division duplex (TDD) arrangement, the same carrier frequency or range is used for the downlink and uplink and is allocated over time among downlink and uplink communications.

Further, each coverage area may also define a number of air interface channels for carrying information between the base station and the UEs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that UEs may detect as an indication of coverage and may measure to evaluate coverage strength. As another example, each coverage area may define an uplink control channel or other resource on which UEs may transmit control messages such as registration requests and access requests to the base station. And each coverage area may define a downlink control channel or other resource on which the base station may transmit control messages such as system information messages and page messages to UEs. Each coverage area may then further define one or more uplink and downlink shared channels, such as traffic channels or other resources, which the base station may allocate for use on an as-needed basis to carry communications between the base station and served UEs.

When a UE first powers on or enters into a base station's coverage area, the UE may "attach" with the base station, by transmitting an attach request to the base station. The attach request may cause the base station or associated infrastructure to authenticate and authorize the UE to be served by the base station and to reserve network resources for use to serve the UE. For instance, the attach request may result in setup of one or more virtual bearer connections extending in the network between the base station and one or more transport networks and extending over the air interface as a radio link between the base station and the UE.

Once the UE is attached with a base station, the UE may operate in a connected mode or an idle mode. In the connected mode, the UE may engage in communication of bearer data (e.g., application layer communications, such as voice communication, video communication, file transfer, gaming communication, or the like), transmitting bearer data on uplink traffic channel resources to the base station and receiving bearer on downlink traffic channel resources from the base station. After a timeout period of no bearer data communication, or for other reasons, the UE may then transition from the connected mode to the idle mode, with the base station releasing the radio link portion of any bearer connections assigned to the UE so as to conserve air interface resources. In the idle mode, the UE may then simply monitor a downlink control channel to receive overhead information and to check for any page messages. And the UE may engage in signaling with the base station to transition back to the connected mode if and when the UE receives a page message from the base station indicating an inbound bearer communication or if and when the UE seeks to engage in outbound bearer communication.

Overview

As noted above, a base station may be responsible for allocating shared channel resources for carrying communications between the base station and served UEs. In practice, for instance, when a UE has bearer data to transmit to the base station, the UE may transmit to the base station a scheduling request that indicates a desire to transmit the bearer data, and the base station may responsively allocate particular uplink shared channel resources for use by the UE and transmit to the UE a directive to use the allocated uplink shared channel resources. The UE may then communicate to the base station using the allocated resources.

The scheduling request that the UE transmits to the base station may be a generalized request, such as a single-bit, that indicates the UE's desire to transmit bearer data but that does not specify how much bearer data the UE seeks to transmit. To allow the base station to allocate an appropriate extent of uplink shared channel resources for the UE's bearer data transmission, the base station may then respond to such a request by allocating a small portion of uplink shared channel resources for use by the UE to transmit a "buffer status report" (BSR) indicating how much data the UE has buffered for transmission, and the UE may transmit the BSR using those allocated resources. Upon receipt of the BSR from the UE, the base station may then allocate to the UE an appropriate extent of uplink shared channel resources, and at that point the UE may then transmit bearer data to the base station using those allocated resources.

Unfortunately, however, this BSR process may undesirably delay bearer communication from the UE, as the UE must first receive from the base station an allocation of resources for transmission of a BSR and then transmit the BSR to the base station before the UE receives from the base station an allocation of resources for transmission of the bearer data that the UE wanted to transmit in the first place. For certain types of bearer communications, such as file transfers or the like, this may not pose a significant issue. However, for other types of bearer communications, particularly those that are sensitive to delay, this may pose an issue.

One way to avoid this delay issue is to simply configure the base station to respond to a UE's generalized scheduling request by allocating to the UE a default extent of uplink shared channel resources, such as an extent that is deemed by engineering design to be sufficient for most purposes. Advantageously, this arrangement would avoid the delay of having the base station allocate resources first for transmission of the BSR and receive the BSR from the UE before the base station allocates resources for bearer transmission from the UE. Unfortunately, however, this non-BSR process may be undesirable as well, as it may result in the base station inefficiently over-allocating shared channel resources.

Disclosed herein is an improved method and apparatus to help manage allocation of resources in a wireless communication system, by having a base station dynamically select between such BSR and non-BSR processes, based on the type of bearer communication in which the UE is engaging, such as whether the communication is delay sensitive or not. If the UE is engaging in a bearer communication that is delay sensitive, for instance, then the base station may opt to apply a non-BSR process in order to expedite allocation of uplink shared channel resources. Whereas, if the UE is engaging in bearer communication that is not delay sensitive, then the base station may opt to apply a BSR process in order to efficiently allocate an appropriate extent of uplink shared channel resources.

Accordingly, in one respect, disclosed is a method operable by a base station. The method includes, while the base station serves a UE over an air interface that defines an uplink control channel having periodically occurring scheduling request (SR) opportunities and that defines an uplink shared channel with allocable resources, receiving by the base station from the UE an SR in one of the SR opportunities, the SR defining a request from the UE for resource allocation on the uplink shared channel. Further, the method involves the base station determining a type of bearer communication in which the UE is engaging, and, based on the determined type of bearer communication, making a decision of whether the resource allocation should be for transmission of a buffer status report from the UE or rather for transmission of bearer data from the UE. And the method then involves the base station allocating uplink shared channel resources to the UE in accordance with the decision, in response to the SR received from the UE on the uplink control channel.

In another respect, disclosed is a base station that is configured to serve a UE over an air interface defining a control channel and a traffic channel. The base station is configured to receive from the UE on the control channel a scheduling request that does not specify a quantity of bearer data to be transmitted by the UE to the base station, and to respond to the scheduling request by allocating resources of the traffic channel for use by the UE to engage in transmission to the base station. Further, the base station is configured to determine a type of communication in which the UE is engaged, and based on the determined type of communication, to either (i) make the allocation of traffic channel resources be for transmission from the UE of a buffer status report that specifies the quantity of bearer data to be transmitted by the UE and that will in turn trigger allocation of additional traffic channel resources to the UE for transmission of the bearer data or rather (ii) make the allocation of traffic channel resources be for transmission from the UE of the bearer data without the UE first transmitting a corresponding buffer status report.

And in yet another respect, disclosed is a base station that configured to serve a UE over an air interface, wherein the air interface defines an uplink control channel and further defines an uplink shared channel, and that is configured receive from the UE on the uplink control channel an SR defining a request from the UE for uplink shared channel resource allocation. In line with the discussion above, such a base station may have a BSR mode of operation and a non-BSR mode of operation, and the base station may be configured to selectively operate in either the BSR mode or the non-BSR mode based on a type of bearer data the UE is communicating.

In this implementation, when the base station operates in the BSR mode with respect to a received SR, the base station responds to the received SR at least in part by (i) allocating to the UE a first extent of uplink shared channel resources for use to carry from the UE to the base station a BSR indicating a quantity of bearer data to be transmitted from the UE to the base station, (ii) receiving the BSR from the UE on the allocated first extent of uplink shared channel resources, and (iii) in accordance with the received BSR, allocating to the UE further uplink shared channel resources for bearer data communication from the UE to the base station. On the other hand, when the base station operates in the non-BSR mode with respect to a received SR, the base station responds to the received SR received by allocating to the UE a second extent of uplink control channel resources for bearer data communication from the UE to the base station without first receiving from the UE a BSR for the bearer data communication, the second extent being greater than the first extent.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will now be described by way of example in the context of LTE communication. It should be understood, however, that principles of the disclosure can extend to various other air interface protocols as well, with variations where appropriate. Further, even within the context of LTE communication, numerous variations from the specific arrangements and processes described herein are possible. For instance, various described machines, connections, functions, and other elements may be added, omitted, distributed, re-located, combined, or changed in other ways.

Figure 1:
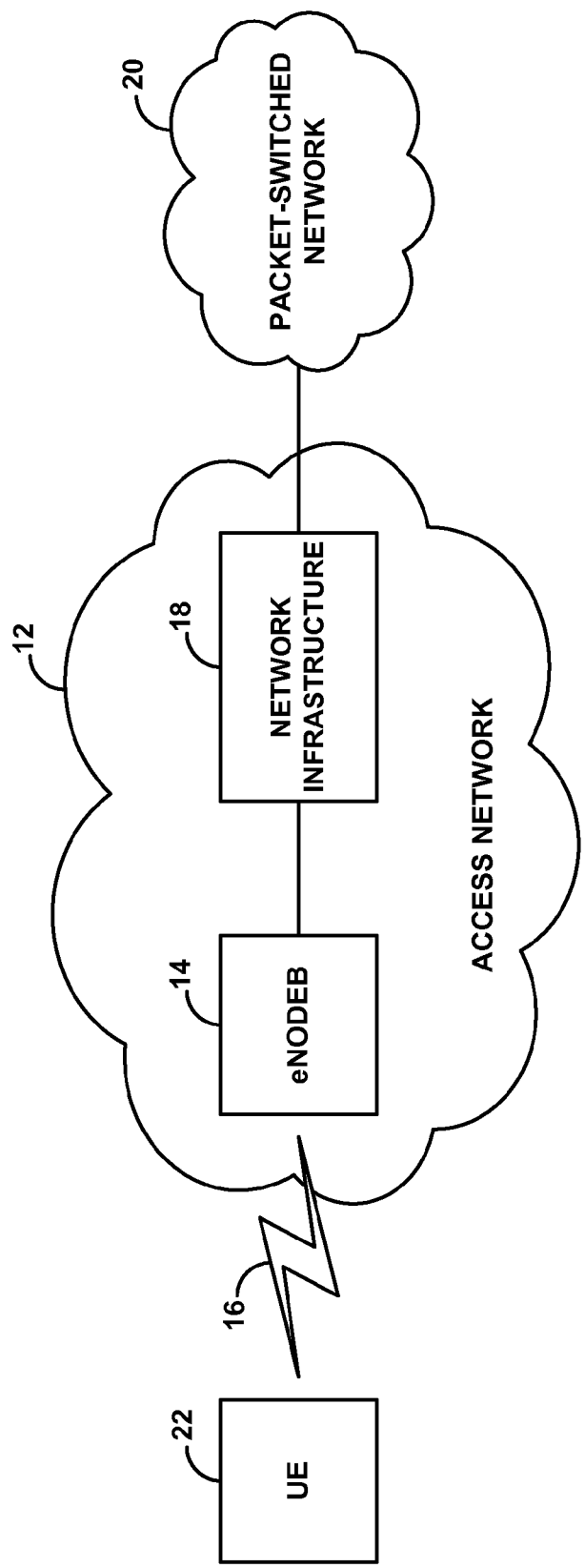
FIG. 1 is a simplified block diagram of a network arrangement in which an exemplary embodiment of the present method and apparatus can be implemented.

The arrangement of FIG. 1 includes by way of example a representative LTE access network 12 including an example LTE base station known as an eNodeB 14, which radiates to provide a wireless coverage area defining an LTE air interface 16 through which the eNodeB may serve one or more UEs. The eNodeB is then shown coupled with core LTE network infrastructure 18, which may include a mobility management entity (MME), a serving gateway (SGW) and a packet-data network gateway (PGW) providing connectivity with a packet-switched network 20 such as the Internet. Shown within coverage of the eNodeB 14 is then a representative UE 22. In practice, the LTE access network may be operated by a cellular wireless service provider, and the UE may subscribe to service of that provider.

In accordance with a recent version of LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 µs each, with each symbol segment spanning the 12-subcarriers of the resource block and thus supporting transmission of 12 orthogonal frequency division multiplex (OFDM) symbols in respective "resource elements." Thus, the eNodeB and a served UE may transmit symbols to each other in these resource elements, particularly on subcarriers that are spaced apart from each other by 15 kHz and in time segments spanning 67 µs each.

The LTE air interface may then define various channels made up of certain ones of these resource blocks and resource elements. For instance, on the downlink, certain resource elements across the bandwidth may be reserved to define a physical downlink control channel (PDCCH) for carrying control signals such as page messages and resource allocations from the eNodeB to UEs, and other resource elements may be reserved to define a physical downlink shared channel (PDSCH) that the eNodeB can allocate to carry transmissions to particular UEs on an as-needed basis. Likewise, on the uplink, certain resource elements across the bandwidth may be reserved to define a physical uplink control channel (PUCCH) for carrying control signals such as scheduling requests from UEs to the eNodeB, and other resource elements may be reserved to define a physical uplink shared channel (PUSCH) that the eNodeB can allocate to carry transmissions from particular UEs on an as-needed basis.

In practice, the PUCCH may define various periodically occurring "scheduling request opportunities" in which a UE such as UE 22 may transmit scheduling requests to the eNodeB. For instance, each scheduling request opportunity for the UE may be a particular resource element on the PUCCH, occurring every fourth transmission TTI (i.e., every 4 milliseconds) or the like. Optimally, the eNodeB would signal to the UE to direct the UE which scheduling request opportunities are for the UE. Thus, the UE can transmit a scheduling request to the eNodeB by simply transmitting a 1-bit or other predefined bit in one of its scheduling opportunities, and the eNodeB may thus monitor the PUCCH for such a scheduling request from the UE.

Upon receipt of scheduling request from the UE, the eNodeB may then schedule uplink transmission by the UE. In particular, the eNodeB may generate and transmit to the UE on the PDCCH "downlink control information" (DCI) that specifies scheduling information in a manner sufficient to inform the UE what resources on the PUSCH the UE should use for transmitting data to the eNodeB. For instance, the DCI may designate particular resource blocks in which the UE may transmit on the PUSCH. In practice, this allocation may be for a TTI that is some predefined time period after the TTI in which the UE sent the scheduling request, such as a TTI that is 4 milliseconds later. Thus, if the UE sends a scheduling request in a particular TTI, then the resource allocation that the UE receives in response to that request may be for resources in a TTI that occurs 4 milliseconds later.

In line with the discussion above, the eNodeB may respond to a scheduling request from a UE using a BSR process or a non-BSR process.

In a BSR process, the eNodeB may allocate PUSCH resources appropriate for the UE to transmit to the eNodeB a buffer status report indicating a quantity of bearer data that the UE has buffered to transmit, so that the eNodeB can thereafter allocate to PUSCH resources appropriate for the UE to transmit some or all of that bearer data. The buffer status report may have a defined size or size range, such as several bytes for instance. Thus, in the BSR process, the eNodeB may allocate several bytes worth of PUSCH resources for carrying a BSR from the UE, and as noted above that allocation may be for a TTI that is 4 milliseconds after the TTI in which the UE provided the scheduling request. The allocation may specify to the UE through predefined coding that the allocation is for transmission of a BSR (such as by using a special DCI format or including an appropriate flag in the DCI for instance), or the fact that the allocation is so small may signify to the UE that the allocation is for transmission of a BSR.

Once the UE then transmits the BSR to the eNodeB using the allocated PUSCH resources, the eNodeB may then read the BSR and, based on the quantity of data indicated in the BSR, allocate further PUSCH resources to the UE for carrying some or all of the indicated bearer data. This allocation of PUSCH resources for the bearer data transmission may be much greater than the allocation of PUSCH resources was for the BSR transmission, as the quantity of buffered data is likely to be much greater than just several bytes. Further, this allocation may be for a TTI that is 4 milliseconds after the TTI in which the UE provide the BSR. Upon receipt of this allocation of PUSCH resources for the bearer data transmission, the UE may then transmit at least a portion of its buffered bearer data to the eNodeB using the allocated PUSCH resources.

In a non-BSR process, on the other hand, the eNodeB may simply allocate some default predefined portion of PUSCH resources to the UE, forgoing receipt of a BSR from the UE for the bearer data. For instance, this default predefined portion of PUSCH resources may be a portion that is deemed by engineering design to likely support a sufficient burst or other bearer data transmission from the UE, perhaps tens, hundreds, or thousands of bytes, depending on LTE implementation and other factors. (As a general matter, if the eNodeB would allocate a first extent of PUSCH resources for BSR transmission, the eNodeB would allocate a second, likely much greater, extent of PUSCH resources for bearer data transmission.) Further, this allocation may similarly be for a TTI that is 4 milliseconds after the TTI in which the UE provided the scheduling request. Thus, when the TTI occurs, the UE may proceed to transmit some or all of its buffered bearer data without the delay associated with allocation of BSR-transmission resources and transmission of the BSR to the eNodeB.

In accordance with the present disclosure, the eNodeB will dynamically decide which of these processes to apply, based at least in part on a consideration of the type of bearer data communication in which the UE is engaging. For instance, if the UE is engaging in a type of bearer data communication that tends to be latency-sensitive, then the eNodeB may decide to apply the non-BSR process, to help expedite the bearer data communication. Whereas, if the UE is engaging in a type of bearer data communication that is not particularly latency-sensitive, then the eNodeB may decide to apply the BSR process, to help more efficiently allocate uplink resources. Further, the eNodeB could base the decision on other distinguishing characteristics of the type of bearer communication in addition to or instead of the latency-sensitivity of the bearer communication. For example, the eNodeB could consider typical size of the bearer communication, identity or service level of one or more parties to the communication, and/or other factors.

Further, at issue in this analysis by the eNodeB could be what type of bearer communication the UE is actually engaged in currently and/or what type of bearer communication the UE is likely to be engaged in currently. In terms of actual communication by the UE, the eNodeB may thus consider what type of bearer data has been flowing to and/or from the UE during the UE's current connection with eNodeB, such as during the past several minutes or the like. The eNodeB may determine the type of that communication by engaging in deep packet inspection of packet communications to or from the UE or, perhaps more simply, by noting a quality of service class indicator (QCI) or other service level descriptor of the bearer connection over which the UE is currently communicating, which may be designated at the time of bearer establishment and/or in association with the scheduling request and may indicate a level of latency-sensitivity of the bearer communication. Further, another network entity (such as a gateway or the like) could perform the analysis to determine the type of bearer data communication in which the UE is actually engaged and could signal to the eNodeB, in which case the eNodeB's receipt of that information could amount to the eNodeB determining the information.

In terms of likely communication by the UE, the eNodeB may predict what type of bearer communication the UE is likely to be engaged in currently by considering past bearer communication by the UE in correspondence with time of day and/or location, again possibly relying on analysis by one or more other network entities. For example, the eNodeB may keep a record per time of day of the type of bearer communication in which a UE engaged, and the eNodeB may then predict that the UE is likely to be engaging in a particular type of bearer communication at the present time of day based on the record indicating that the UE has tended to engage in that type of bearer communication at the same time of day in the past. And as another example, the eNodeB may keep a record per UE geographic location of the type of bearer communication in which the UE is engaged, and the eNodeB may then predict that the UE is likely to be engaging in a particular type of bearer communication based on the fact that the UE is at a particular location and has tended to engage in the particular type of bearer communication when at that location in the past.

As a specific example, the eNodeB may determine through one or more of these analyses that the UE is currently engaged in online action gaming communication, such as a multi-party game of some sort. In practice, to help improve fairness of such communication between players that may have different network connection speeds, each game participant may regularly transmit an Internet Control Message Protocol (ICMP) echo request known as a "ping" to a gaming server and receive a ping reply from the gaming server, and the participant and/or gaming server may use the transmission time of that ping message and/or reply as a basis to offset timing of communications between the participant and the gaming server. Given the desire for those pings to pass without added delay, the eNodeB may thus deem the UE's type of bearer communication to be latency-sensitive, and the UE may thus responsively opt to apply the non-BSR process for responding to a scheduling request from the UE.

And as another example, the eNodeB may determine through one or more of these analyses that the UE is currently engaged in online file transfer or connectionless communication such as e-mail communication. If the eNodeB is set to deem such communication as not latency-sensitive, then the eNodeB may responsively opt to apply the BSR process to help more efficiently allocate uplink resources for the communication. Other examples are possible as well.

In general, the eNodeB may monitor or track the type of communication in which the UE is engaged (actually or likely) as a background process, so that when the eNodeB receives a scheduling request from the UE, the eNodeB can promptly decide whether to apply the BSR process or the non-BSR process. The eNodeB may then maintain a record per UE of whether the eNodeB should be operating in a BSR mode (in which the eNodeB would apply the BSR process upon receipt of a scheduling request from the UE) or rather in a non-BSR mode (in which the eNodeB would apply the non-BSR process upon receipt of a scheduling request from the UE).

Figure 2:
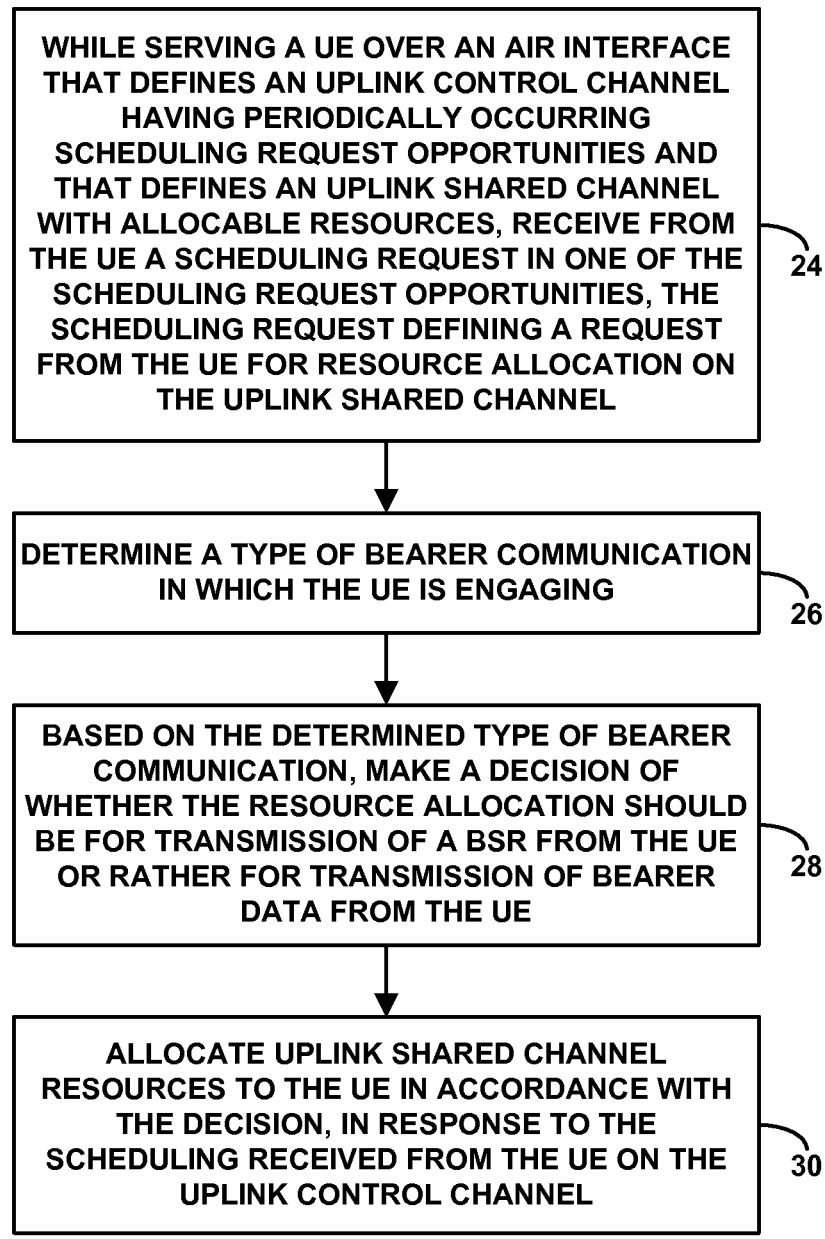
FIG. 2 is a flow chart depicting functions that can be carried out in accordance with an example implementation of the method.

FIG. 2 is next a flow chart depicting functions that may be carried out by a base station such as eNodeB in accordance with an example implementation of the present method. As shown in FIG. 2, at block 24, while the base station serves a UE over an air interface that defines an uplink control channel having periodically occurring scheduling request opportunities and that defines an uplink shared channel with allocable resources, the base station receives from the UE a scheduling request in one of the scheduling request opportunities, the scheduling request defining a request from the UE for resource allocation on the uplink shared channel. At block 26 (which as noted above may occur in the background and may thus occur in parallel with or before block 24 rather than after block 24 as shown), the base station determines a type of bearer communication in which the UE is engaging.

At block 28, based on that determined type of bearer communication, the base station makes a decision of whether the resource allocation should be for transmission of a BSR from the UE or rather for transmission of bearer data from the UE. And at block 30, the base station allocates uplink shared channel resources to the UE in accordance with the decision, in response to the scheduling received from the UE on the uplink control channel. For instance, if the decision is that the resource allocation should be for transmission of a BSR from the UE, then the base station may allocate just several bytes of uplink shared channel resources to the UE for transmission of that BSR. Whereas, if the decision is that the resource allocation should be for transmission of bearer data from the UE, then the base station may allocate a greater default extent of uplink shared channel resources to the UE for transmission of bearer data from the UE.

In a particular implementation of this process, the received scheduling request may be a single-bit as noted above and may thus not indicate to the base station a quantity of the bearer data to be transmitted from the UE. Further, the act of the base determining the type of communication in which the UE is engaging may be done without any consideration of content of the received scheduling request but may involve one or more other analyses such as those discussed above for instance.

Figure 3:
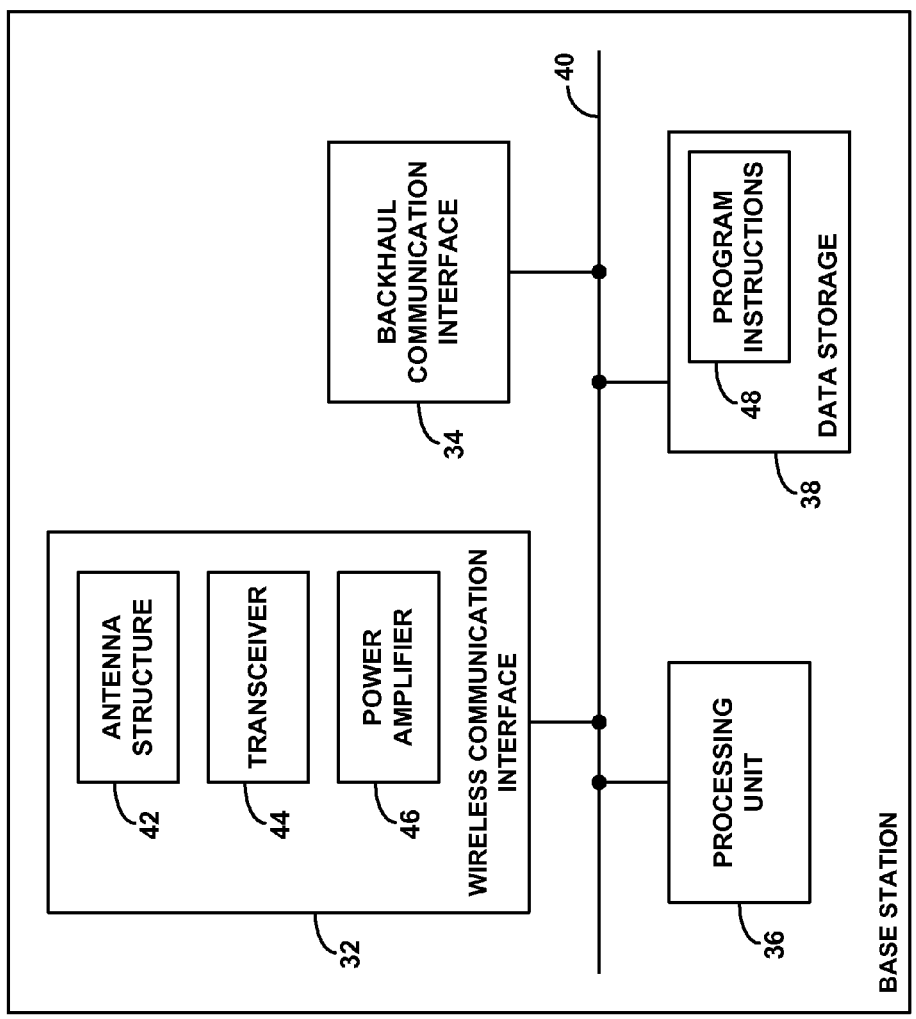
FIG. 3 is a simplified block diagram of an example base station operable in accordance with the present disclosure.

FIG. 3 is next a simplified block diagram of an example base station, showing components that the base station may include in an example implementation. This base station may take various forms such as, for instance, a "macro base station" of the type implemented in public spaces typically including a cell tower and tower top antenna structure, or a "small cell", "femtocell", or the like, of the type that typically has a smaller form factor and is designed to provide smaller coverage and perhaps to operate in a smaller area such as in a home or office.

As shown, the example base station includes a wireless communication interface 32, a backhaul interface 34, a processing unit 36, and data storage 38, all of which may be communicatively linked together by a system bus, network, or other connection mechanism 40 or may be integrated together or modified in any of a variety of ways.

As shown, the wireless communication interface 34 includes an antenna structure 42, a transceiver 44, and a power amplifier 46, which may interoperate to facilitate air interface communication with served UEs in accordance with an agreed air interface protocol such as LTE. The backhaul interface 34 may then comprise a network communication interface such as an Ethernet connection, through which the base station may then communicate with network infrastructure such as described above for instance. The processing unit 36 may then comprise one or more general purpose processors (e.g., microprocessors) and/or one or more special purpose processors (e.g., application specific integrated circuits). And the data storage 38 may comprise one or more volatile and/or non-volatile storage components such as magnetic, optical, or flash storage for instance. As further shown, the data storage 38 may then contain program instructions (program logic) 48 executable by the processing unit 36 to carry out various functions described herein. Alternatively, as noted above, components of the base station may be structured in other ways, such as by having the processing logic be integrated with the wireless communication interface, on a common chipset for instance.

With this arrangement, the air interface over which the base station is configured to serve a UE may define a control channel (e.g., PUCCH) and a traffic channel (e.g., PUSCH). Further, the base station may be configured by its program logic or otherwise to receive from the UE on the control channel a scheduling request that does not specify a quantity of bearer data to be transmitted by the UE to the base station, and to respond to the scheduling request by allocating resources of the traffic channel for use by the UE to engage in transmission to the base station. Further, the base station may be configured by its program logic or otherwise to determine a type of communication in which the UE is engaged, and based on the determined type of communication, to either (i) make the allocation of traffic channel resources be for transmission from the UE of a BSR that specifies the quantity of bearer data to be transmitted by the UE and that will in turn trigger allocation of additional traffic channel resources to the UE for transmission of the bearer data or rather (ii) make the allocation of traffic channel resources be for transmission from the UE of the bearer data without the UE first transmitting a corresponding BSR.

In line with the discussion above, the base station may be configured to determine the type of communication in which the UE is engaged without any consideration of content of the received scheduling request. For instance, the base station may be configured to determine the type of communication at least in part by using deep packet inspection to evaluate packet traffic communicated to or from the UE and/or based at least in part on a QCI of a bearer connection on which the UE is communicating. Further, the base station may be configured to determine the type of communication in which the UE is engaged based at least in part on (i) a factor selected from the group consisting of time of day and location and (ii) historical data indicating type of bearer communication by the UE in correspondence with the factor.

As a specific example in line with the discussion above, the type of communication could be latency-sensitive communication or not latency-sensitive communication. If the type of communication is not latency-sensitive communication, then the base station may responsively make the allocation of traffic channel resources be for transmission from the UE of the buffer status report. Whereas, if the type of communication is latency-sensitive communication, then the base station may instead make the allocation of traffic channel resources be for transmission from the UE of the bearer data without the UE first transmitting a corresponding buffer status report.

Considering the base station in another way, as discussed above, the base station may have a BSR mode of operation in which the base station responds to a scheduling request received from the UE on an uplink control channel at least in part by (i) allocating to the UE a first extent of uplink shared channel resources for use to carry from the UE to the base station a BSR indicating a quantity of bearer data to be transmitted from the UE to the base station, (ii) receiving the BSR from the UE on the allocated first extent of uplink shared channel resources, and (iii) in accordance with the received BSR, allocating to the UE further uplink shared channel resources for bearer data communication from the UE to the base station. Further, the base station may have a non-BSR mode of operation in which the base station responds to the scheduling request received from the UE on the uplink control channel by allocating to the UE a second extent of uplink control channel resources for bearer data communication from the UE to the base station without first receiving from the UE a BSR for the bearer data communication, the second extent being greater than the first extent.

The base station may then be configured by its program logic or otherwise to selectively operate in either the BSR mode or the non-BSR mode based on a type of bearer data the UE is communicating, in line with the functions discussed above for instance.

Exemplary embodiments have been described above. Those skilled in the art will understand, however, that changes and modifications may be made to these embodiments without departing from the true scope and spirit of the invention.

We claim:

1. A base station configured to serve a user equipment device (UE) over an air interface, wherein the base station comprises:

a wireless communication interface, wherein the air interface defines an uplink control channel and further defines an uplink shared channel, the base station being configured to receive from the UE on the uplink control channel a scheduling request (SR) defining a request from the UE for uplink shared channel resource allocation, wherein the base station has a buffer status report (BSR) mode of operation in which the base station responds to the SR received from the UE on the uplink control channel at least in part by (i) allocating to the UE a first extent of uplink shared channel resources for use to carry from the UE to the base station a BSR indicating a quantity of bearer data to be transmitted from the UE to the base station, (ii) receiving the BSR from the UE on the allocated first extent of uplink shared channel resources, and (iii) in accordance with the received BSR, allocating to the UE further uplink shared channel resources for bearer data communication from the UE to the base station, wherein the base station has a non-BSR mode of operation in which the base station responds to the SR received from the UE on the uplink control channel by allocating to the UE a second extent of uplink control channel resources for bearer data communication from the UE to the base station without first receiving from the UE a BSR for the bearer data communication, the second extent being greater than the first extent, and wherein the base station is configured to selectively operate in either the BSR mode or the non-BSR mode based on a type of bearer data the UE is communicating.

2. The base station of claim 1, wherein the received SR does not indicate the quantity of the bearer data to be transmitted from the UE to the base station.

3. The base station of claim 1, wherein the base station is configured to determine the type of bearer data the UE is communicating, to then decide whether to operate in the BSR mode or rather in the non-BSR mode, and to operate accordingly.

4. The base station of claim 1, wherein the base station is configured to determine the type of bearer data the UE is communicating without any consideration of content of the received SR.

5. The base station of claim 3, wherein the base station is configured to determine the type of bearer data the UE is communicating at least in part by using deep packet inspection to evaluate packet traffic communicated to or from the UE.

6. The base station of claim 3, wherein the base station is configured to determine the type of bearer data the UE is communicating based at least in part on a quality of service class identifier (QCI) of a bearer connection on which the UE is communicating.

7. The base station of claim 3, wherein the base station is configured to determine the type of bearer data the UE is communicating based at least in part on (i) a factor selected from the group consisting of time of day and location and (ii) historical data indicating type of bearer communication by the UE in correspondence with the factor.

* * * * *